United States Patent [19]

Purcell

[11] Patent Number: 4,936,683
[45] Date of Patent: Jun. 26, 1990

[54] OPTICAL TABLET CONSTRUCTION

[75] Inventor: Alex M. Purcell, Guilford, Conn.

[73] Assignee: Summagraphics Corporation, Seymour, Conn.

[21] Appl. No.: 369,729

[22] Filed: Jun. 22, 1989

[51] Int. Cl.$^5$ .................... G01B 11/26; G01C 1/00
[52] U.S. Cl. .................... 356/152; 250/206.2; 340/707; 356/400; 341/5
[58] Field of Search .................... 340/707; 250/221.1; 356/141, 152, 400

[56] References Cited

U.S. PATENT DOCUMENTS

| | | |
|---|---|---|
| 3,553,680 | 1/1971 | Correman .................... 340/707 |
| 3,876,877 | 4/1975 | Meulensteen et al. .................... 250/222.1 |
| 3,923,402 | 12/1975 | Turcotte .................... 356/152 |
| 3,942,009 | 3/1976 | Taylor. |
| 4,205,304 | 5/1980 | Moore .................... 340/707 |
| 4,568,182 | 2/1986 | Modjallal .................... 356/1 |
| 4,688,933 | 8/1987 | Lapeyre .................... 356/1 |
| 4,837,430 | 6/1989 | Hasegawa .................... 250/222.1 |

Primary Examiner—Stephen C. Buczinski
Attorney, Agent, or Firm—Rosen, Dainow & Jacobs

[57] ABSTRACT

An optical digitizer or tablet employing a linear image sensor behind a microlouver strip and extending along a coordinate axis of a coordinate axes plane. In one embodiment, a non-directional light source floods the plane, and a cursor is provided with a reflector that reflects incident light. In another embodiment, the light source is on the reflector, and the sensor-microlouver combination is located along each tablet edge.

14 Claims, 3 Drawing Sheets

OPTICAL TABLET CONSTRUCTION

BACKGROUND OF THE INVENTION

1. Field Of The Invention

This invention relates to optical digitizers, and more particularly to a system wherein the position of a probe or cursor in a coordinate system may be automatically digitized.

2. Description Of The Prior Art

It is frequently desirable to determine the location digitally of a cursor in a two or three coordinate system. Various techniques have been employed in the past for this purpose, employing various position sensing devices such as piezoelectric devices and magnetostrictive devices, or involving electromagnetic or electrostatic coupling of the cursor to an electrode array in a tablet. By the term "cursor" or "probe" used herein is meant an implement manipulated by a user or a machine over a surface or in space and whose position relative to the surface or space is to be determined and stored or displayed or whose position is to be set. While such arrangements have been in general satisfactory from the standpoint of the results that are achieved, they do have certain problems. For example, the boards or surfaces upon which the cursor is moved must be specially designed and are relatively expensive, thereby increasing the cost and reducing the portability of the system.

U.S. Pat. No. 4,568,182, issued to Modjallal and assigned to the assignee of the present application, discloses an optical system for determining the position of a probe or cursor which is movable on a plane surface having coordinate axes. The system includes a source of light which is rotated and thus scanned across a coordinate axes plane, and a detector receiving light from a reflector along certain angles to which the light beam is instantaneously directed. The coordinate system employs curved mirrors at the origin and at a point spaced from the origin along one of the coordinate axes, and plane mirrors extending along this coordinate axis. The light source is associated with the cursor. A calculator determines the position of the cursor in the coordinate system by triangulation. In another embodiment, the cursor is purely passive and includes a curved mirror, with rotating light sources and detectors positioned at determined points in the coordinate plane.

Summary Of The Invention

An object of the invention is an optical coordinate position measuring or determining apparatus which is simpler and more economical to manufacture than the known optical digitizer.

A further object of the invention is an optical digitizer which does not require a rotating light source.

Still another object of the invention is an optical digitizer construction in which critical optical components can be located below the tablet over which the cursor is moved.

Another object of the invention is an optical digitizer which does not require collimated or highly directional light sources.

These and other objects and advantages as will appear hereinafter are achieved, in accordance with one aspect of the invention, with an optical X, Y coordinate position measuring apparatus comprising a tablet having an illuminated field generated by a continuous light source and a pair of linear image or optical sensors, each extending parallel to a coordinate axis. One linear image sensor is used for each of the two coordinate axes. The arrangement is such that the light from the continuous light source impinges on the probe or cursor whose coordinate position on the tablet is desired and is reflected back to one or both of the coordinate axes. Each linear image sensor preferably comprises an array of photosensors which are respectively aligned with a like number of microlouvers. The microlouvers are respectively aligned with the reflected light from the source such that the source is effectively imaged on a respective photosensor to which certain of the reflected light is being directed, and it in turn generates an electrical signal corresponding to that detected reflected light by the probe or cursor positioned on the tablet. Circuitry is coupled to the linear image sensor output to mitigate or remove signal-spoiling effects and to compute the cursor's position linearly and very accurately. External optical filters can be used to remove the ambient lights. In this embodiment, the light source and detector are associated with the tablet, and the cursor is a purely passive reflector.

In accordance with another aspect of the invention, a probe or cursor is configured as a rod with a spherical or cylindrical light source at its lower end and is suspended over the tablet surface representing the two-axis coordinate plane. Light from the spherical or cylindrical source is reflected off a mirror respectively set at an angle to the coordinate plane at each coordinate axis. The light then passes to the respective microlouver and photosensor arrays where it is converted to a cursor position indication in similar fashion to that previously described. In this embodiment, the cursor has associated with it the light source, and the detector is associated with the tablet.

In accordance with still another aspect of the invention, the array of photosensors are sequentially scanned on a periodic basis, first along one coordinate axis and then along the other coordinate axis. This will create electrical signals in the time domain that can be correlated to the position in each array of a particular photosensor that is then aligned with the cursor.

In a preferred embodiment, each linear image sensor extends longitudinally along or adjacent a tablet edge, with the microlouvers similarly extending next to and in front of the image sensor. The function of the microlouvers is to ensure that each photosensor in the array is most sensitive to light incident in a particular direction. In its simplest form, the micro-louvers transmit light primarily normal to the microlouver. Moreover, the opposite tablet edges are non-reflecting. Hence, though non-directional light is flooding the tablet surface, and reflecting in all directions from the reflective cursor, the elements of the photosensor directly opposite, or in line with, the cursor will receive the most incident light and thus generate the largest signal. The appropriate circuitry, by determining the position of that sensor element, will thus determine the corresponding coordinate axis position of the cursor. By the same token, the cursor can be constructed to be non-reflecting. Then, with reflectors positioned along the opposite tablet edges, the non-reflective cursor would interrupt or reduce the light incident on the aligned photosensor element. This reduced signal intensity associated with the aligned sensor element can also be used to determine cursor position.

Brief Description Of The Drawings

The invention will now be described in greater detail in connection with several exemplary embodiments of the invention, reference being had to the accompanying drawings, wherein.

Detailed Description Of The Preferred Embodiments

Figure 1:
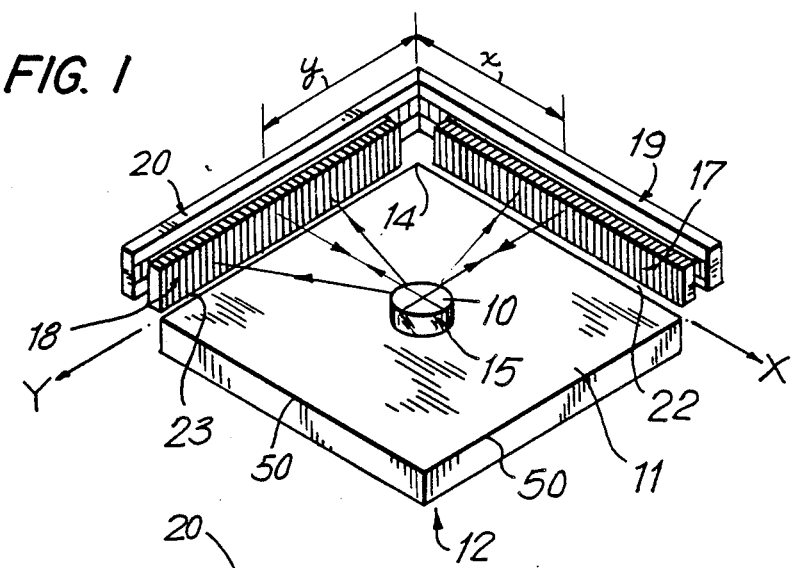
FIG. 1 is a perspective view of one embodiment of the invention.

With reference to FIG. 1, a probe or cursor 10 is freely movable over the surface 11 of a tablet 12. The tablet 12 has coordinate X and Y axes extending in the plane of its surface 11 from an origin 14. In the embodiment of FIG. 1, the X-axis is indicated by the line labelled X extending from the origin 14, and the Y-axis is by the line so labelled. The cursor 10 is provided with a light reflective cylinder 15 whose reflective cylindrical surface has an axis perpendicular to the surface 11 and which is placed on the surface 11 of the tablet 12. The object is to locate the position of the axis of the cursor 10 with respect to the X and Y axes, represented in the figure by the lower case x and y distances.

Mounted along each of the coordinate axes X,Y is a linear array of microlouvers 17,18 the size and geometry of each of which is such that a ray of light reflected from the cursor 10 must be essentially perpendicular to the louver openings in order to pass therethrough. In addition, a continuous light source (not shown) is mounted along each coordinate axis, the light from which passes below the microlouvers through respective slits 22,23 extending along each tablet edge and thus flooding the plane of the tablet surface 11 in all directions from its respective coordinate axis. The light that floods the surface is non-directional. Some of that light impinges on the cylindrical reflecting surface 15 on the cursor 10, and is reflected back toward the tablet edges where the microlouvers 18,19 are located. Only the reflected light travelling essentially perpendicular to the respective microlouvers, in this embodiment, will pass through. The remaining light is reflected. Linear image sensors 19,20 are provided behind each respective microlouver. Thus, the light sensitive element of each sensor array located immediately behind the louver portion located on a line substantially perpendicular to the coordinate axis and intercepting the cursor will receive the largest amount of incident light. Due to light scattering, other detecting elements will also be illuminated but to a much lesser degree than that received by the orthogonally-positioned detecting element.

Appropriate circuitry connected to the linear image sensors (described below) merely has to distinguish the stronger signal from the orthogonally-positioned detecting element, from the weaker signals generated at the other detecting elements. Improved resolution is obtained by maximizing detection of the orthogonally-reflected rays and minimizing detection of light rays at other angles. The function of the microlouvers 17,18 does exactly that. Commercially available units from the 3M Company are in the form of a thin plastic film containing closely spaced black microlouvers. The film simulates a tiny Venetian blind to shield out unwanted ambient light and allow transmission of direct light. In a form well suited for the invention, the film, known commercially as the LCF 0°, is available in continuous lengths sufficient to extend along the full length of the tablet edge, is only about 0.030 inches thick, yet provides 75% transmission of normal incident light, falling to about 45%, only 15° off the normal, and thus provides excellent directional control of the reflected rays or, to put it another way, excellent rejection of incident light outside of a narrow cone. The orientation of the louvers is standing vertically, perpendicular to the tablet surface 11.

An alternative structure, but performing the same function of selectively transmitting essentially normal incident light rays, is available commercially from NSG America, Inc., and is known as a SELFLOC lens array, which consists of an elongated strip of one or two rows of graded-index microlenses. What this does is optically image on one side (behind it) a line or narrow field located a fixed distance from its opposite (front) side. Since the intensity of the light directly reflected back along the normal direction from the cursor reflector is substantially greater than the light intensity at adjacent points, the light detector element located directly behind this type of lens array will receive the highest amount of light and thus generate the strongest signal. Such devices are widely used in optical sensing devices in copiers, facsimiles and printers, where the purpose is to focus a line of an object into a detector.

The image sensors 19,20 also extend to the full length of the tablet edge behind and in close proximity to the light directional elements 17,18. Such sensors are well known in the art as contact type linear image sensors and are available commercially from such companies as Fuji-Xerox and Epson America, and are similarly found in many copiers, facsimiles and printers. They essentially consist of a line of tiny light-sensitive elements, very narrow and closely spaced, and arranged in a line, and providing via separate outputs a signal representing light intensity as a function of element position along the length of the array. The light detecting elements come in various forms, such as amorphous silicon pin photodiodes, or polycrystalline silicon thin-film transistors, or the like. For a tablet with a 12 inch long active X or Y coordinate, a sensor array containing 1024 cells arrayed in a line would be suitable. A higher density of cells would provide increased resolution if desired.

The light source also extends along each tablet edge to provide a sheet of non-directional light over the tablet surface, obtained in a preferred arrangement by providing a narrow slit 22,23 along each tablet edge, adjacent the X and Y coordinate axes of the surface. Any elongated light source would be suitable for this purpose, of the type, typically fluorescent, commonly found in copiers, facsimiles and printers.

Figure 2:
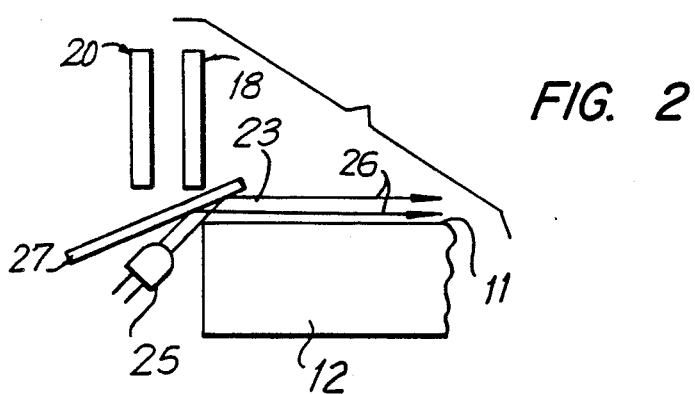
FIG. 2 is a detailed schematic view of the tablet edge of the embodiment of FIG. 1.

FIG. 2 illustrates, in an enlarged form, a preferred arrangement. The view is taken along the Y direction from the near edge of the tablet as shown in FIG. 1. The light source, in this instance, is an infrared L.E.D. array 25, mounted so as to extend the length of and alongside the left tablet edge. A slot (not shown) may be formed in the lamp array to direct the radiation upward. A flat mirror 27 then directs the IR energy 26 via the slot 23 along the tablet surface 11.

Figure 3:
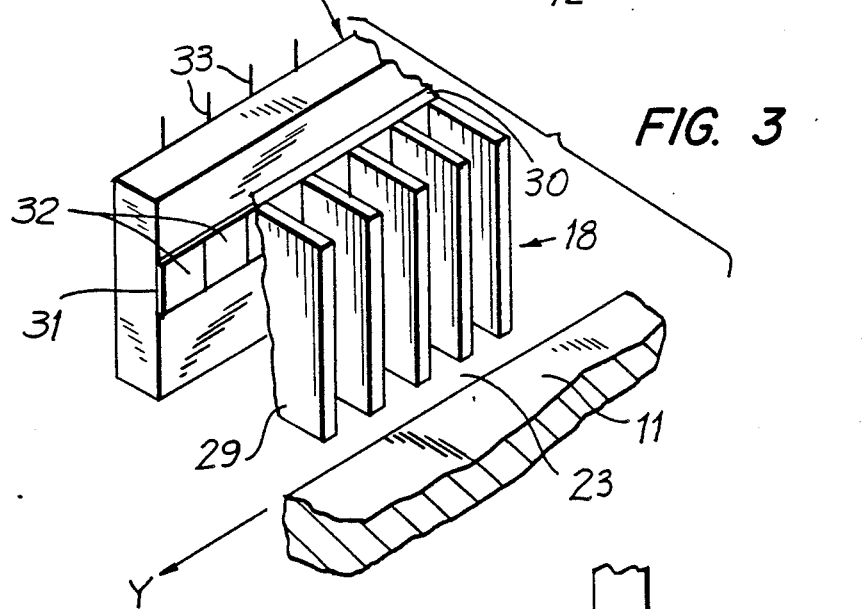
FIG. 3 is an enlarged schematic view of a side edge of the tablet.

FIG. 3 is an enlarged view from the front showing the louver arrangement and sensor over a small portion of the tablet edge. As previously mentioned, the preferred arrangement has the louver elements 29 extending perpendicular to its support 30 and thus perpendicular to the Y axis. The linear image sensor 20 typically contains an active strip 31 containing side-by-side in a line active detecting elements 32, each located behind the space between adjacent louvers. Each active element may have its own output lead 33 as shown. In this arrangement, as mentioned above, slit sourced light reflected from the cursor 10 passes through the microlouver elements 29 and is incident on the array of detecting elements 32 behind it, both components extending, as shown, parallel to the X and Y axes. It is not actually necessary that the light-detecting elements 32 be accurately aligned with the spaces between the louver elements 29, because, as will be apparent from the circuitry described below, and since the width of a detecting element typically exceeds the louver spacing, the signal output from the sensor array will still show a maximum at a position very close to the actual position of the cursor. Any minor variations can be taken care of by appropriate calibration of the apparatus.

Figure 4:
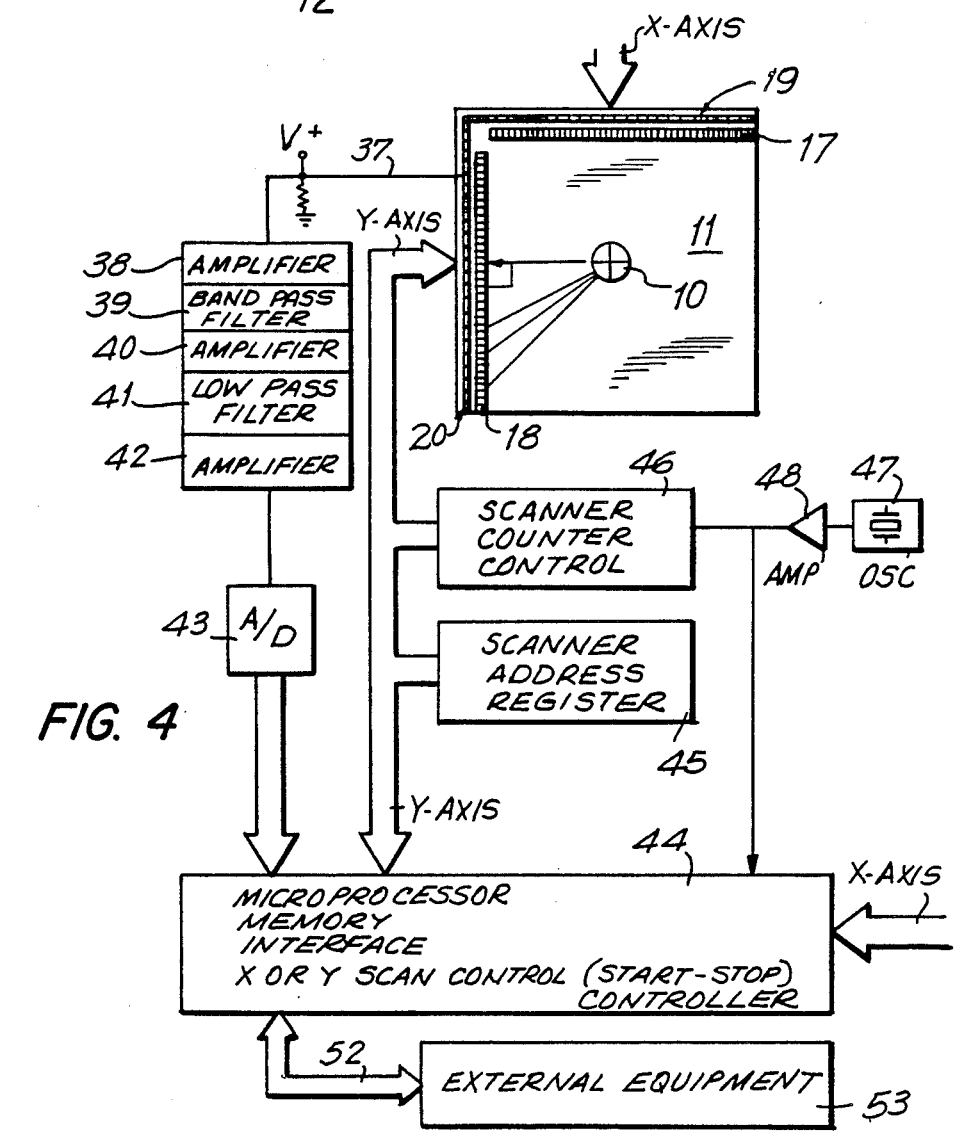
FIG. 4 illustrates a block diagram of the circuitry connected to the embodiment of FIG. 1.

After outputting from the photosensors, the signals are processed in a manner as will be explained with reference to FIG. 4 to determine the exact position of the cursor on the tablet plane. Reference numerals used in FIG. 4 are the same as those for like elements in FIG. 1, though the component arrangement is not exact. From FIG. 4, it can be seen that the electrical output 37 from the Y axis linear image sensor 20 is passed through a first amplifier 38, bandpass filter 39, a second amplifier 40 and a low pass filter 41. The function of these filters is to filter out signal frequencies associated with ambient or stray light. The signal, after further amplification 42, then passes through an analog-to-digital converter 43 and then to a controller 44. Controller 14, which may be any conventional microcontroller, has within it interface circuitry for communicating information 52 as to the cursor location to external equipment 53 such as printers, plotters and cathode ray tubes. Controller 44 also has within it a microprocessor for controlling a sequential scan of both the X and Y linear light sensor arrays. Since the linear image scanner, for example, available from Fuji Xerox has 1,024 cells within 12 inches, a moderately fast scan rate is adequate, although obviously the faster the scan rate, the more accurate the momentary position of the cursor can be determined. The desired scan rate is programmed into the memory of the microprocessor in controller 44.

Controller 44 also interfaces with scanning address register 45 and scanner counter control 46 to control the scanning operation. Synchronization of the controller 44, scanning address register 45, and scanner counter 46 is supplied by a clock oscillator 47 through an amplifier 48. Scan controller 44 contains within its memory an address for each sensing element 32 in the linear arrays 19,20. Since light reflected from the cursor sometimes reaches sensors adjacent to the one perpendicular to the cursor, the microprocessor contains within it signal averaging circuitry enabling it to determine which sensor is most nearly normal to the cursor.

The manner in which the disclosed circuitry operates will be evident to those skilled in the art. Briefly, the controller scans simultaneously each sensing element of the X-coordinate and Y-coordinate arrays, or if desired could scan the arrays in sequence. Thus, the controller knows, from the counter value 46, which sensing element has generated the signal currently being processed. After digitizing, a corresponding memory array will thus have stored a series of values, with the highest value corresponding to the detecting element aligned with the cursor.

FIGS. 1 and 4 illustrate several light rays to and from the cylindrical cursor. Due to the optical geometry illustrated, it will be evident that skewed light rays will, for the most part, be rejected by the louvers. Only the light reflected directly back, normal to the coordinate axis, will be maximally transmitted to the sensors. It will be noted that the opposite edges of the tablet 50 (the lower and right hand sides in FIG. 1) are free of reflectors to avoid normal reflection from the effective light sources which are the slits 22,23. This is readily accomplished by providing an absorbing surface (not shown) at those edges 50. As will be further noted, it doesn't much matter in which direction the light emanates from the slits 22,23. The cylindrical cursor reflector, together with the louver arrangement, ensures that the cursor position on the tablet surface will be represented by a larger signal output at the sensor located directly opposite. Conventional signal analoging techniques from multiple scans can be included to enhance the signal-to-noise ratio. The characteristics of the filters in the signal processing chain are not critical. Those skilled in this art will recognize the desired filter characteristics to be used to reject scanning and ambient light effects.

Instead of a cylindrical reflector on the cursor, a retro-reflector can be substituted. A retro-reflector has the optical property that incident light is reversed 180° and reflected back in a path exactly parallel and in the same plane as the incident light. With one or more of such optical components mounted on the cursor, so that all incident light, from any direction, is reflected back to the source, it will be evident that only the light along the normals to the coordinate axes and intercepted by the cursor will primarily be transmitted through the microlouvers to the sensor array.

The controller at appropriate times will output a coded signal via line 52 to the external equipment 53. For example, for a display, the coded signal would tell a conventional monitor where to position the cursor on a CRT to correspond to the X-position of the tablet probe 10. For a printer or plotter, the appropriate printing element would be similarly positioned. This is all well known in the art and is not a part of the present invention.

The invention is not limited to the particular circuitry described. For instance, a CCD type of sensor may be employed. This sensor stores in a row of sensor-storage elements the signal intensity during a sensing interval, and then periodically outputs in a stream along one conductor a time varying signal which in the time domain is mapped to the stored signal intensities in the space domain. This output can be processed in a conventional manner to determine the peak signal intensity and thus the location of the sensor directly opposite the cursor reflector.

Other signal processing methods performing the same functions are also considered within the scope of the invention.

The circuitry interconnecting the image sensor along the X axis with the controller 44 is not shown but as indicated in FIG. 4 is identical in structure and function to that interconnecting the Y axis image sensor and controller 44.

Figure 5:
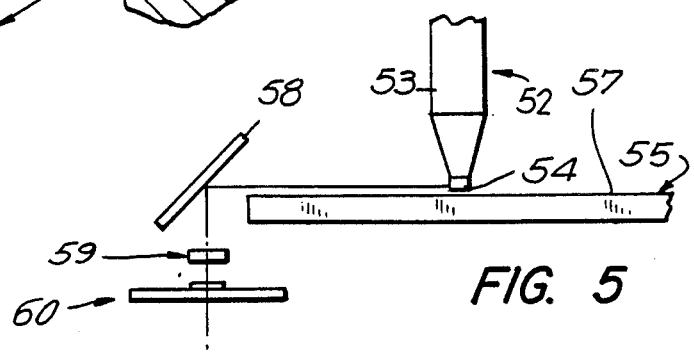
FIG. 5 is an elevational view of another embodiment of the invention.

FIG. 5 illustrates another embodiment of the invention, which differs from the embodiment of FIG. 1 in that the light source is on the probe, and only the detectors and microlouvers are associated with the tablet. In addition, the latter has been relocated below the tablet surface. As illustrated, a probe or cursor 52 comprising a rod 53 prober and a spherical or cylindrical point light source 54 at the rod's lower end is suspended over a tablet 55. Light from the light source 54, which travels in all directions parallel to the tablet surface 57, is reflected off a mirror 58 which may be set at an appropriate angle, such as 45°, to impinge upon a microlouver array 59 and thence upon a linear image sensor 60 similar to the corresponding elements in FIG. 1. The mirror 58 would extend along the full length of the active edge of the tablet coordinate plane, along both the X and Y directions. This embodiment has the advantage of locating the sensor and louver components below or inside the tablet body, and thus out of the way of a user. The spherical or cylindrical light source can be any miniature bulb capable of generating light equally over a full 360°, so that the user needn't trouble over angular positioning of the probe 52. As with the FIG. 1 embodiment, maximum light detection will occur at the sensing elements aligned with the X and Y coordinate positions of the probe.

Any suitable light that can be readily generated and detected is usable. Typically, this would be visible or infrared light. The light can be continuously generated, or pulsed, so long as the pulse rate substantially exceeds the scan rate.

Figure 6:
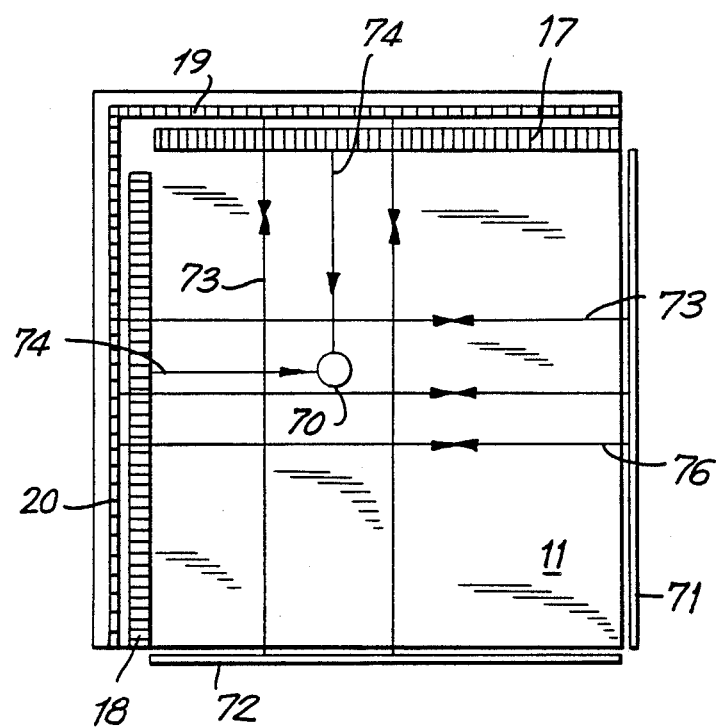
FIG. 6 is a plan view of still another embodiment of the invention.

FIG. 6 illustrates a third embodiment of the invention, which differs from the previous embodiments in that the cursor is provided with a non-reflecting or absorbing surface. With reference to FIG. 6, a cursor 70 is provided with a non-reflecting surface. The light source (not shown), the micro-louver arrays 17, 18 and the linear image sensors 19, 20 are the same as in the FIG. 1 embodiment. In this case, however, reflectors 71, 72 are positioned along the tablet edges opposite to that where the microlouvers and sensors are positioned. The reflectors 71, 72 simply reflect back any light incident on their surfaces. The operation is fundamentally similar to that of the FIG. 1 embodiment, except that now the location of the sensor generating the smallest signal representing the least incident light corresponds to the coordinate position of the cursor. As will be observed from the several light rays illustrated, with a sheet of light flooding the surface 11, the light 73 not intercepted by the cursor and thus reflected back to the sensors will produce high level signals, whereas those light rays 74 which are intercepted by and are absorbed by the cursor 70 will not be reflected back to the oppositely-located sensors, which will thus generate low-level signals.

As will be evident from the preceding description, an optical X,Y coordinate position defining, measuring or determining apparatus is described which is compact, and which is capable of determining the cursor's position, linearly and accurately. Moreover, the optics are considerably simplified over that of the previously referenced patent, as no rotatable elements are necessary. Further, the computation of the cursor position is simplified because the sensor element generating the maximum signal will be located at the coordinate position sought, and no triangulation calculations are necessary.

It is understood that the foregoing has shown and described particular embodiments of the invention, and that variations thereof will be obvious to one skilled in the art. Accordingly, the embodiments are to be taken as illustrative rather than limitative, and the true scope of the invention is as set out in the appended claims.

What is claimed is:

1. An optical system for defining the position of an object in a coordinate system comprising:
   a light source positioned to provide light in a plane defined by two coordinate axes of said system upon said object, said object being capable of reflecting said light;
   at least one array of light sensors positioned adjacent each said two coordinate axes so as to receive said reflected light and capable of generating an electrical signal in response to received light;
   means for directionally transmitting said reflected light such that only light directed along substantially one angle to the sensor array substantially reaches one light sensor or immediately adjacent light sensors at any particular position of the object; and
   means for determining or establishing said object's position from said generated electrical signal.

2. The optical system of claim 1, wherein said means for directionally transmitting said reflected light comprises at least one array of microlouvers for each coordinate axis, each said array of microlouvers extending parallel to their respective coordinate axes and between said object and said light sensors.

3. An optical system for defining the position of an object in a planar coordinate system comprising:
   a light source attached to said object and positioned adjacent to a plane defined by two coordinate axes of said system, said light source being capable of radiating light in all directions in a plane parallel to said two coordinate axes:
   at least one array of light sensors positioned adjacent to each coordinate axis so as to receive light from said light source, said light sensors being capable of generating an electrical signal in response to received light;
   means for directionally transmitting said radiated light such that it impinges substantially upon only one light sensor or immediately adjacent sensors of each of said arrays of light sensors at any particular position of the object; and
   means for determining or establishing said object's position from said generated electrical signal.

4. The optical system of claims 1 or 3, wherein said means for determining or establishing said object's position from said generated electrical signal comprises a scan controller connected to said light sensors adjacent each of said two coordinate axes, said scan controller functioning to sequentially scan said array of light sensors.

5. The optical system of claim 4, wherein said means for determining or establishing said object's position from said generated signal further comprises filter means connected to an output of said light sensors, an analog-to-digital converter connected to an output of said filter means, and means for connecting said analog-to-digital converter to said scan controller.

6. An optical system as set forth in claim 2, wherein a light reflector is mounted on the object,
   said light reflector having the characteristic of reflecting back along a parallel path any light ray incident thereon.

7. The system of claim 6, wherein the light reflector is cylindrical with an axis perpendicular to the said plane.

8. The system of claim 6, wherein the light source is an elongated source located adjacent to and extending parallel to each coordinate axis.

9. The system of claim 6, wherein the light source is a slit extending between a plane edge and a bottom surface of the microlouver array.

10. The system of claim 3, wherein the light source is a spherical or cylindrical light emitter.

11. The system of claim 10 wherein a flat mirror extends along each edge of the coordinate axis plane in a position to reflect incident light to below the said plane, said sensors and directionally transmitting means being located below the said plane.

12. The system of claims 1 or 3, wherein the light source is stationary, and opposite edges of the coordinate axis plane are free of reflectors.

13. An optical system for defining the position of an object in a planar coordinate system comprising:

a light source positioned so as to radiate light from two coordinate axes of said system upon said object, said object being capable of absorbing said radiated light;

light reflectors positioned on the opposite side of said object along axes parallel to said two coordinate axes from which light is radiated, one or more arrays of light sensors positioned adjacent said two coordinate axes from which light is radiated so as to receive reflected light from said reflectors and capable of generated an electrical signal in response to received light;

means for collimating light and being located in front of each of said arrays;

said object acting to interrupt light that would otherwise impinge upon the light sensors; and means for computing said object's position from said generated electrical signal.

14. The optical system of claim 13, wherein said means for collimating reflected radiated light comprises an array of microlouvers extending parallel to each said coordinate axis and between said object and said one or more arrays of light sensors.

* * * * *